April 12, 1955          J. R. MACY          2,706,234

HEATING DEVICE FOR HOT MACHINING APPARATUS

Filed Aug. 18, 1952

INVENTOR.
James R. Macy
BY Paul O. Pippel
Atty.

United States Patent Office 2,706,234
Patented Apr. 12, 1955

2,706,234

HEATING DEVICE FOR HOT MACHINING APPARATUS

James R. Macy, Chicago, Ill., assignor to International Harvester Company, a corporation of New Jersey Application August 18, 1952, Serial No. 304,928

5 Claims. (Cl. 219—10.57)

This invention relates to an improved heating device used in connection with the hot machining of metals. More specifically, this invention relates to an improved induction coil positioned on a machining apparatus, the coil being adapted to heat a localized portion of work which is to be machined.

In the Berliner Reissue Patent 23,092, reissued March 22, 1949, a novel method and apparatus for machining metals is disclosed. In this patent an induction coil is mounted on a machining apparatus such as a lathe, the induction coil being arranged to surround a piece of metal or work which is mounted in the lathe. The induction coil which is connected to a high frequency current is adapted to heat a localized portion of the work to a plastic state whereupon a conventional cutting tool may be utilized to remove substantially large portions of metal in a single pass or machining operation. By softening the metal with the use of an induction coil a localized portion of the metal is immediately heated to a high plasticity whereupon the friction between the cutting tool and the work is greatly reduced so as to permit rapid machining while a substantially large section is removed from the metal. In the disclosure shown in the above mentioned patent the induction coil encircles the metal work piece, the coil being disposed in longitudinally spaced relation with respect to the cutting tool. Thus, to some extent the metal work piece is heated at one point and cutting takes place at a second point removed from the first point or maximum heated portion of the work. It is a prime object of this invention to provide an induction coil for a hot machining operation, the coil being constructed to permit the cutting tool to engage the work in a cutting operation directly at the point of maximum heating provided by the induction coil.

A still further object is to provide an induction coil for a hot machining apparatus the induction coil including an access opening disposed intermediate the ends of the coil, the access opening permitting the movement of a cutting tool into engagement with the work to be machined directly at the point where the induction coil is most effective to heat a localized portion of the work.

A more specific object is to provide an improved induction coil for a hot machining apparatus, the coil comprising a plurality of connected spiral coil turns which are adapted to encircle the work, the coil turns including U-shaped portions which extend longitudinally with respect to the axis of the coil, certain of the U-shaped portions extending in a first direction and other U-shaped portions extending in an opposite direction to provide an access opening through the induction coil, the access opening permitting the insertion and retraction of a cutting tool into engagement with the work at a point substantially centrally positioned from the ends of the induction coil.

A still more specific object is to provide an improved induction coil for a hot machining apparatus, the coil including a plurality of spiral turns which are mounted to encircle the work to be machined, certain coil turns including first U-shaped portions including first legs which extend longitudinally with respect to the axis of the coil in a first direction, the longitudinally extending legs being connected by integral connecting elements extending laterally with respect to the longitudinal legs, other coil turns including second U-shaped portions having second legs extending longitudinally in an opposite direction with respect to the first legs, the second legs also including integral laterally extending connecting elements and centrally disposed U-shaped portions of the coil defining an access opening through which a cutting tool may be inserted for engaging the work to be machined.

These and further objects will become more readily apparent from a reading of the specification when examined in connection with the accompanying sheet of drawing.

Figure 1:
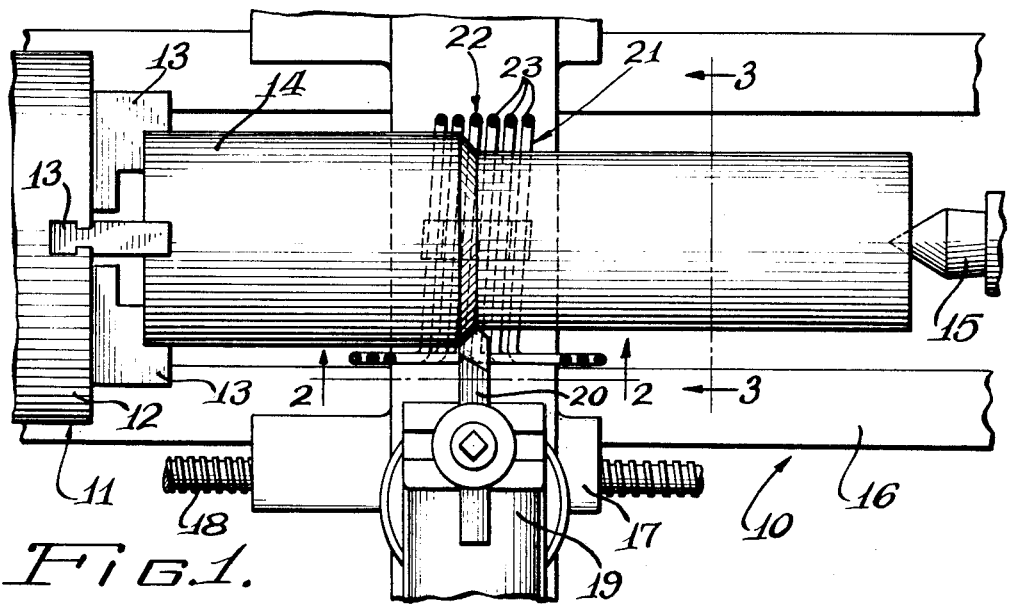
Figure 1 is a plan view of a hot machining apparatus showing a heating element connected thereto with portions thereof in section.

Referring now particularly to Figure 1 a machining apparatus such as a lathe is generally indicated by the reference character 10. The lathe 10 includes a work supporting member 11 which may be in the form of a conventional chuck having jaws 13 which firmly engage the end of a work piece 14. The other end of the work piece 14 is suitably supported or journaled on a tapered spindle 15 supported in a conventional manner on the lathe 10. The lathe 10 is provided with longitudinally extending guideway 16 on which a carriage or tool holding slide 17 is positioned for movement. The tool holding slide 17 is movable longitudinally on the guideway 16 by means of a lead screw 18 operating in a conventional manner.

A clamping member 19 is supported on the tool holding slide 17. The clamping member 19 may be moved laterally with respect to the work piece 14 in a conventional manner, suitable provisions being made on the tool holding slide 17 to effect this movement. A cutting tool 20 is firmly held on the clamping member 19.

Figure 2:
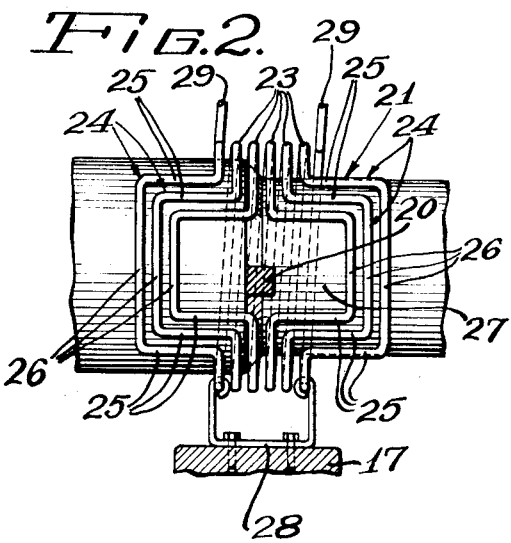
Figure 2 is a side elevational view of a heating device for a hot machining apparatus, the view being taken substantially along the line 2, 2 of Figure 1.
Figure 3:
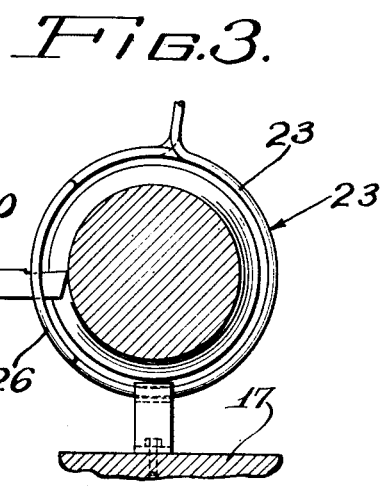
Figure 3 is a sectional view through a portion of a work piece supported on a hot machining apparatus, the view showing an improved heating device, the view being taken substantially along the line 3, 3 of Figure 1.

The heating element for performing a hot machining operation is generally designated by the reference character 21. The heating element 21 comprises a high frequency induction coil 22 which includes a plurality of laterally spaced and connected spiral coil turns 23. The coil turns 23, as best indicated in Figures 1 and 2, encircle the work piece 14 in a conventional manner. Each spiral coil turn 23 is provided with a U-shaped or loop portion 24. As best indicated in Figure 2 a first group of coil turns 23 have their U-shaped portions 24 in nesting arrangement and facing in a first direction. A plurality of second spiral coil turns have their U-shaped portions 24 facing in a second direction so as to provide a substantially rectangular configuration or nesting arrangement which is disposed in a plane substantially parallel to the axis of the coil. Each of the U-shaped portions 24 comprises longitudinally extending leg elements 25 which are interconnected by means of laterally extending connecting elements 26 thereby forming the U-shaped configuration. It must be understood that the type of coil material used may be conventional, the type disclosed here being hollow copper tubing.

The U-shaped portions 24 are positioned in a nesting arrangement in a manner wherein the legs and connecting elements of the more centrally disposed and adjacent U-shaped portions define an access opening indicated at 27. The heating element 21 is suitably connected to the movable carriage 17 by means of a bracket 28. Terminal connecting ends 29 extend from the induction coil 22 to a suitable source of high frequency power (not shown). A conventional coolant system may also be connected to the terminal ends 29 for continually cooling the induction coil 22 during operation.

In operation the lathe 10 functions in a conventional manner. The induction coil 22 effectively and inductively heats a localized portion of the work piece 14 to a point where the metal is plastic for a certain depth and the cutting tool 20 is effective to remove a predetermined amount of material. By virtue of the novel arrangement of the induction coil 22, and the access opening 27, the tool 20 may be positioned centrally with respect to the ends of the coil so that the working tool is operative at the point of the work 14 where the most efficient heating occurs. The access opening 27 is sufficiently large so that various sizes of tools may be utilized. Since the U-shaped portions 24 project outwardly from opposite ends of the spiral coil turns 23, portions of the work 14 outside of the coil turn are heated to a semiplastic condition this heat being increased as the induction coil is moved with the slide 17 over the point of the work which has thus been heated. This type of induction coil is particularly effective and efficient in the utilization with the cutting and machining arrangement shown. The induction coil completely surrounds the work at the localized point wherein heating must take place, the only interruption being the access window which permits the insertion and retraction of the cutting tool 20.

It is now apparent that the features of the invention have been fully stated and that an improved induction coil for a hot machining apparatus has been provided. The type of induction coil can easily be adapted to either a lathe, milling machine, shaper, drilling machine, etc., to provide for a localized heating in combination with the cutting operation of the cutting tool.

It can now be seen that the objects of the invention have been fully achieved and it must be understood that changes and modifications may be made which do not depart from the spirit of the invention as disclosed nor the scope thereof as defined in the appended claims.

What is claimed is:

1. For a machining apparatus comprising a movable work supporting member, a cutting tool, and means for moving said cutting tool into engagement with work supported on said work supporting member; a heating device for heating the work comprising a high frequency induction coil, said coil including a plurality of laterally spaced spirally extending coil turns, means adapted to support said coil adjacent said machining apparatus whereby said coil turns substantially encircle a localized portion of the work adjacent the cutting tool, the first of said coil turns including U-shaped portions extending longitudinally with respect to the axis of the coil in one direction, and second coil turns having U-shaped portions extending longitudinally with respect to the axis of the coil in an opposite direction, the U-shaped portions being disposed in nesting relation in a plane parallel to the axis of the coil, the U-shaped portions of centrally disposed and adjacent coil turns defining an access opening through which the cutting tool may be moved relative to said work.

2. For a machining apparatus comprising a movable work supporting member, a cutting tool and means for moving said cutting tool into engagement with work supported on said work supporting member; a heating device for heating the work comprising a high frequency induction coil, said coil including a plurality of laterally spaced spirally extending coil turns, means adapted to support said coil adjacent said machining apparatus whereby said coil turns substantially encircle a localized portion of the work adjacent the cutting tool, first coil turns including U-shaped portions having first leg elements extending longitudinally in a first direction with respect to the axis of the coil, and first connecting elements extending laterally with respect to said first leg element and being connected thereto, second coil turns including U-shaped portions having second leg elements extending longitudinally with respect to the axis of the coil in a second direction, and second connecting elements extending laterally with respect to said second leg elements and being connected thereto, the centrally disposed coil turns of the first and second U-shaped portions defining an access opening through which the cutting tool may be moved relative to said work.

3. For a machining apparatus comprising a rotating work supporting member, and a tool holding slide including a cutting tool longitudinally movable with respect to said work supporting member; a heating device for heating said work comprising a high frequency induction coil, said coil including a plurality of spirally extending hollow coil turns adapted to encircle work positioned on said work supporting member, means adapted to support said coil on said machining apparatus, first of said coil turns including generally loop-shaped first portions extending longitudinally in a plane substantially parallel to the axis of the coil in a first direction, and second of said coil turns including generally loop-shaped second portions extending longitudinally in a plane substantially parallel to the axis of the coil in an opposite direction, said loop-shaped portions defining an opening in the coil through which the cutting tool may be moved for engaging the work.

4. For a machining apparatus comprising a rotating work supporting member, and a tool holding slide including a cutting tool longitudinally and laterally movable with respect to work supported on said supporting member; a heating device for heating local areas of the work comprising a high frequency induction coil, said coil including a plurality of spirally extending coil turns adapted to encircle work positioned on said work supporting member, means adapted to support said coil on said tool holding slide, one of said coil turns including a loop-shaped first portion extending longitudinally in a plane substantially parallel to the axis of the coil in a first direction, and a second of said coil turns including a loop shaped second portion extending longitudinally in a plane substantially parallel to the axis of the coil in a second direction, the said loop shaped portions being disposed in adjacent relation to define an access opening in the coil through which the cutting tool may be moved into and out of engagement with the work.

5. For a machining apparatus comprising a work supporting member, a cutting tool relatively movable with respect to said work supporting member and means for moving said cutting tool; a heating device comprising a high frequency induction coil supported on said work supporting member, said coil including a plurality of coil turns adapted to encircle the work supported on said supporting member, means adapted to support said coil on said machining apparatus and longitudinally extending and laterally spaced portions on said coil, said portions defining a rectangular opening lying in a plane substantially parallel to the axis of the coil to provide an access through which said cutting tool may be moved relative to said work and to said coil.

References Cited in the file of this patent

UNITED STATES PATENTS

| | | |
|---|---|---|
| 2,075,079 | Anderson | Mar. 30, 1937 |
| 2,184,534 | Smith et al. | Dec. 26, 1939 |
| 2,374,706 | Saslaw | May 1, 1945 |
| 2,412,797 | Berliner | Dec. 17, 1946 |
| 2,532,014 | Davis | Nov. 28, 1950 |
| 2,600,034 | Weingart | June 10, 1952 |
| 2,600,453 | Weingart | June 17, 1952 |